United States Patent [19]
Gerken et al.

[11] Patent Number: 6,078,198
[45] Date of Patent: Jun. 20, 2000

[54] DEVICE AND METHOD FOR DRIVING A CAPACITIVE ACTUATOR

[75] Inventors: Hartmut Gerken, Nittendorf; Ralf Förster, Regensburg; Martin Hecker, Laimerstadt; Richard Pirkl; Christian Hoffmann, both of Regensburg; Hellmut Freudenberg, Pentling, all of Germany

[73] Assignee: Siemens Aktiengesellschaft, Munich, Germany

[21] Appl. No.: 09/038,639

[22] Filed: Mar. 10, 1998

[30] Foreign Application Priority Data

Mar. 10, 1997 [DE] Germany ............... 197 09 717

[51] Int. Cl.⁷ .................................. H03B 1/00
[52] U.S. Cl. ........................... 327/111; 327/390
[58] Field of Search ................. 327/111, 390, 327/536; 361/56, 111

[56] References Cited

U.S. PATENT DOCUMENTS 5,086,365  2/1992  Lien .......................... 361/58
5,565,790  10/1996  Lee .......................... 326/130
5,689,208  11/1997  Nadd .......................... 327/390

FOREIGN PATENT DOCUMENTS

0173108A2  3/1986  European Pat. Off. .
2431148C2  6/1983  Germany .
4435832A1  4/1996  Germany .

OTHER PUBLICATIONS

"Integrierte Überspannungs–Schutzschaltung", Dipl.–Ing. Detlef Bergmann, Elektronik, 1979, vol. 26, pp. 66–68.

*Primary Examiner*—Jeffrey Zweizig
*Attorney, Agent, or Firm*—Herbert L. Lerner; Laurence A. Greenberg

[57] ABSTRACT

A power MOSFET switch is connected in parallel to a capacitive actuator for the purpose of protecting the actuator against over-voltage. The protective power MOSFET switch is rendered conductive by a supplemental circuit when the actuator voltage exceeds a predetermined threshold limit voltage or when the control circuit emits a corresponding signal.

9 Claims, 2 Drawing Sheets

DEVICE AND METHOD FOR DRIVING A CAPACITIVE ACTUATOR

BACKGROUND OF THE INVENTION

For instance, if an error or defect occurs in the engine, ranging as far as the power end stages of the injection valves, then an injection event can be discontinued immediately, even during charging of the actuators.

providing a charging capacitor connected between a positive pole and a negative pole of a voltage source regulated by a control circuit;

providing a first series circuit connected in parallel with the charging capacitor, the first series circuit including a charging switch connected to the positive pole and admitting current away from the positive pole, and a discharging switch connected to the negative pole and admitting current toward the negative pole;

providing a second series circuit connected between a node of the charging switch and the discharging switch on the one hand and the ground terminal on the other hand, the second series circuit including a recharging capacitor connected to the charging switch, a ring-around coil and a third series circuit formed of a first actuator and a first, controlled power MOSFET switch;

providing at least one fourth series circuit connected in parallel to the third series circuit, the at least one fourth series circuit including a further actuator and a further power MOSFET switch;

providing a diode connected in parallel to the third series circuit and to the fourth series circuit, the diode conducting from the ground terminal towards the ring-around coil; and providing a protective power MOSFET switch connected in parallel to the third series circuit and being controlled by control signals of the control circuit; and immediately upon an activation of a voltage supply of the control circuit or of the voltage source, and prior to a first actuator actuation, simultaneously actuating the charging switch and the power MOSFET switch and subsequently actuating the discharging switch at least once.

Other features which are considered as characteristic for the invention are set forth in the appended claims.

Although the invention is illustrated and described herein as embodied in a device and method for driving at least one capacitive actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
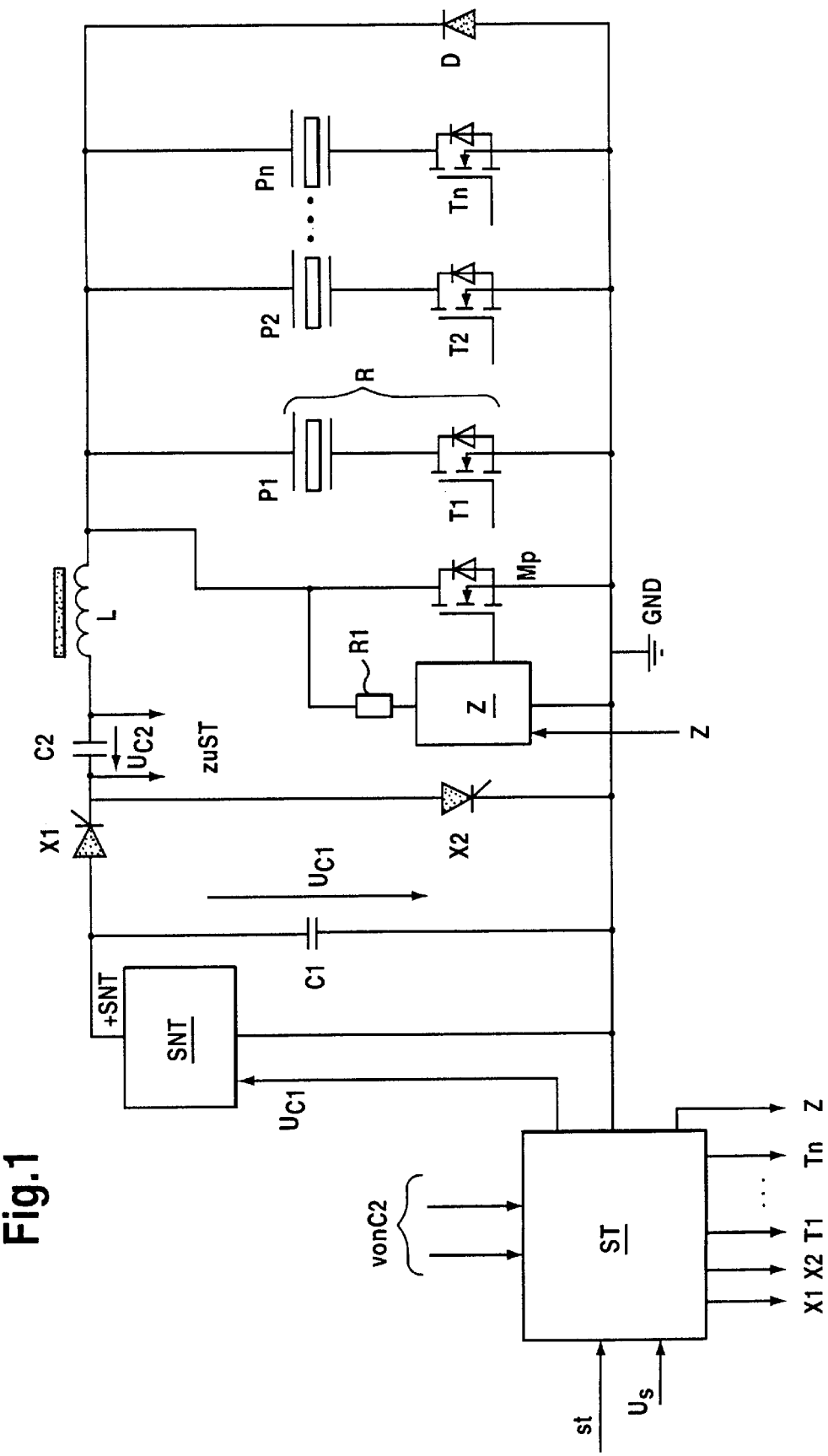
FIG. 1 is a schematic circuit diagram of a device for driving at least one capacitive actuator.

Referring now to the figures of the drawing in detail and first, particularly, to FIG. 1 thereof, there is seen a schematic circuit diagram of a device for triggering a number n of fuel injection valves, not shown in further detail, of a internal combustion engine. The injection valves are driven via piezoelectric actuators P1–Pn by means of a control circuit ST, which forms a part of a microprocessor-controlled engine control unit. A detailed description of the engine control unit is not necessary in this context and, accordingly, it is not shown in further detail for reasons of brevity of the description.

A charging capacitor C1 is connected between the positive pole +SNT and the negative pole GND of a regulated voltage source SNT, preferably a switched-mode power supply. A series circuit comprising a charging switch X1 (connected to the positive pole +SNT and allowing current away from the positive pole) and a discharging switch X2 (connected to the negative pole GND and admitting current toward the negative pole) is connected in parallel to the charging capacitor C1.

The switches X1 and X2 are electronic switches that admit current in only one direction and that comprise at least one semiconductor element, preferably thyristor switches. The switches X1 and X2 are selectively rendered conducting or blocking by the control circuit ST.

A further series circuit is connected between the node of the charging switch X1 with the discharging switch X2 and the ground terminal GND. The further series circuit comprises a recharging capacitor C2, a ring-around coil L connected to the charging switch X1, a first actuator P1, and a first, controlled power MOSFET switch T1.

A diode D is connected in parallel with the series circuit formed of the actuator P1 and the power MOSFET switch T1. The diode D admits current from the ground terminal GND to the ring-around coil L.

For every further actuator P1–Pn, a series circuit comprising this actuator and one further power MOSFET switch T2–Tn is connected in parallel to the series circuit comprising the first actuator P1 and the first power MOSFET switch T1. Power MOSFET switches typically include inverse diodes, whose function is jointly utilized here.

The switches X1, X2 and T1–Tn are controlled by the control circuit ST, as a function of control signals st received from the engine control unit, with a desired value $U_S$ for the voltage with which the actuators P1–Pn are to be charged which is stored in memory in the control circuit ST in this exemplary embodiment, or with a value $U_S$ received from the engine control unit, and in addition with the actual value $U_{C2}$ of the voltage at the recharging capacitor C2. The charging capacitor C1 may be considered to be an output capacitor of the switched-mode power supply SNT.

Assume, for example, a state in which the charging capacitor C1 is at $U_{C1}=+60$ V and the recharging capacitor C2 is at $U_{C2}=+100$ V (taken together in a series circuit these capacitors are charged to a desired voltage $U_S=+160$ V), in which the ring-around coil L is currentless, in which all the switches X1, X2 and T1–Tn are nonconducting (high-impedance), and in which all the actuators P1–Pn are discharged: the actuator P1 should now be actuated in order to inject fuel into a cylinder via the associated injection valve. The value of the desired voltage $U_S$ is stored in memory in the control circuit ST, or is supplied to that circuit by the engine control unit.

First, the control circuit selects the appropriate actuator, by rendering the power MOSFET switch T1 (or T2–Tn) associated with that actuator conducting.

At the onset of injection, which is specified by the onset of a control signal st, the charging switch X1 is fired by the control circuit ST. As a result, the voltage $U_S=+160$ V across the series circuit C1+C2 discharges into the actuator P1 through the ring-back coil L over the course of one full half-sine-wave oscillation. The actuator, in response, opens the respective injection valve. The switched-mode power supply SNT remains connected to the charging capacitor C1, so that it feeds energy jointly into the ring-around circuit as well.

After the polarity reversal, the charging switch X1 is extinguished, and the actuator P1 remains charged. For discharging the actuator at the end of the control signal st, the discharging switch X2 is fired. The discharge current circuit closes via the inverse diode of the power MOSFET switch T1. Via the ring-around coil L, the energy stored in the actuator swings back into the capacitor C2, which can be recharged to $U_{C2}$=+100 V again, for instance, and can be utilized for an ensuing cycle. As soon as the actuator has discharged to the threshold voltage of the diode D that is parallel to the "active" channel, the still-flowing current is propagated via this diode, thereby preventing the actuator from being charged to a negative voltage. After that, the discharging switch X2 is extinguished.

For the charging cycle of the next actuator, the losses that have occurred must first be compensated for. To that end the voltage $U_{C2}$ of the recharging capacitor C2 is measured and then the switched-mode power supply SNT is adjusted (regulated) to an output voltage value that is equivalent to the difference (60 V) between the desired value, $U_S$=+160 V, and the measured voltage, $U_{C2}$=+100 V. The charging capacitor C1 connected to the switched-mode power supply is recharged to this voltage $U_{C1}$ accordingly. Thus for the next charging operation at the series circuit comprising the capacitors C1 and C2, the full voltage $U_S$=+160 V is once more available.

If the device is put back into operation again after a long pause, then first the recharging capacitor C2 is discharged, and the charging capacitor C1 is charged to the output voltage of the switched-mode power supply SNT, such as +60 V. A few transient responses (charging cycles) ensue, until the voltage returned when the actuator was discharged attains the assumed "steady-state" value of $U_{C2}$=+90 V at the recharging capacitor C2 after every polarity-reversing operation.

The device of the invention now resides in the fact that parallel to the at least one series circuit comprising the actuator P1 and the associated actuator switch T1, a controlled power MOSFET switch Mp is provided, and that a supplemental circuit Z is provided by which the power MOSFET switch Mp can be set into the conducting state. As will become clear from the following, the controlled power MOSFET switch Mp may be referred to as a protective power MOSFET switch.

To simplify the definition below, various series circuits are defined as follows: a first series circuit includes the charging switch X1 and the discharging switch X2; a second series circuit includes the ring-around coil L and a third series circuit R formed of the first actuator P1 and the power MOSFET switch T1; at least one fourth series circuit includes the further actuator P2 and others (P3–Pn) and the further power MOSFET switch T2 and others (T3–Tn).

Figure 2:
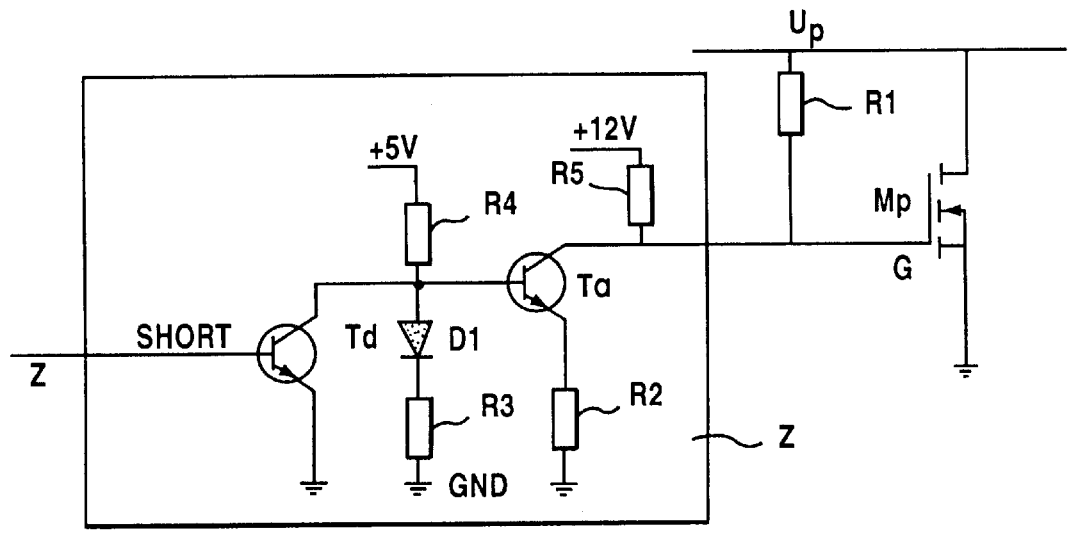
FIG. 2 is a circuit diagram of a first exemplary embodiment of the invention.

FIG. 2 shows a first exemplary embodiment of the supplemental circuit Z shown schematically in FIG. 1. This circuit has a transistor Ta, whose base terminal is connected to the tap of a voltage divider, comprising the resistors R3 and R4 and connected to a reference potential of +5 V, for example, and whose emitter terminal is connected via a resistor R2 to the negative pole GND. The collector terminal of the transistor Ta is connected on the one hand to the gate terminal G of the power MOSFET switch Mp and on the other, via a resistor R5, to a reference potential, for instance of +12 V.

The transistor Ta is connected as a constant current sink, and a resistor R1 is provided between the gate terminal G and the terminal of the power MOSFET switch Mp that is connected to the actuator voltage Up.

With this circuit, by means of the constant current flowing across the resistors R1 and R2, the gate terminal G of the power MOSFET switch Mp is kept to <+0.5 V, as long as the actuator voltage Up remains below a specified limit value Ug.

If the actuator voltage Up on exceeding the specified limit value Ug becomes so high that the current through the resistor R1 becomes greater than the constant current, the transistor Ta begins to block: Now the power MOSFET switch Mp is made conducting via its gate voltage, and it thus limits the actuator voltage.

The magnitude of the constant current determines the reaction time of the power MOSFET switch Mp. If a short reaction time is needed, then the losses in the resistor R1 will be great.

Figure 3:
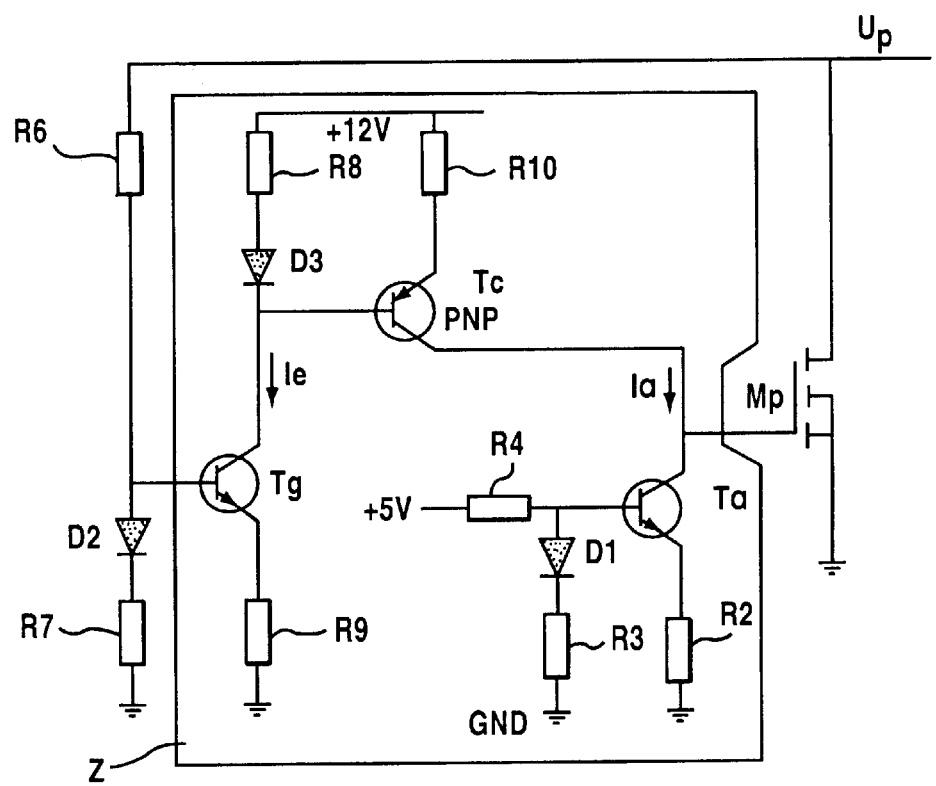
FIG. 3 is a circuit diagram of a second exemplary embodiment of the invention.

This disadvantage can be averted by the circuit, shown in FIG. 3, of a second exemplary embodiment of the supplemental circuit Z, which along with the constant current sink formed by the transistor Ta and the resistors R2–R4 has a current mirror circuit that includes the transistors Tb and Tc and the resistors R8–R10.

The input current Ie of this current mirror circuit is determined by a voltage divider disposed parallel to the switching path of the power MOSFET switch Mp and comprising the resistors R6 and R7, which can be designed with correspondingly high impedance and therefore cause only slight losses even when the reaction times of the power MOSFET switch Mp are short. The output current Ia of this current mirror circuit, which is determined in a known manner by the mirroring factor of the current mirror circuit, is delivered to the collector terminal of the transistor Ta.

With the output current Ia of the current mirror circuit, as in the first exemplary embodiment shown in FIG. 2, the gate terminal G of the power MOSFET switch Mp is kept to <+0.5 V, as long as the actuator voltage Up remains below the specified limit value Ug.

If the actuator voltage Up and thus the output current Ia of the current mirror circuit increase, then the transistor Ta begins to block: Once again, the power MOSFET switch Mp is made conducting via its gate voltage, and it thus limits the actuator voltage.

By means of an additional switch, which is shown in FIG. 2 and is realized by a transistor Td whose collector-to-emitter path is connected between the base terminal of the transistor Ta and the negative pole GND, the power MOSFET switch Mp can be made conducting by control signals z of the control circuit ST, which are delivered to the base terminal of the additional transistor Td.

It is thus possible in a simple way, for instance if an error or defect is detected that extends in the engine as far as the power end stages of the injection valves, and that necessitates an immediate shutoff of the fuel injection, to accomplish the shutoff via a control signal z of the control circuit ST. For the duration of the control signal z, the power MOSFET switch Mp is conducting; by way of it and the inverse diodes or switches T1–Tn, the actuators P1–Pn are discharged in a short-circuited manner, even if charging of an actuator is supposed to be occurring precisely at that time.

In the same way, charging of the actuators resulting from mechanical stress, or a residual voltage that remains after discharging and is detrimental to full utilization of the actuator stroke, can be eliminated by switching the power MOSFET switch Mp to become conducting, between the individual actuator actuations, by means of a control signal z. As a result, all the actuators P1–Pn are discharged completely.

With the aid of the device of the invention it also becomes possible for the full fuel quantity to be injected even in the first injection event. Until now, as noted above, repeated transient responses were necessary before the recharging capacitor C2 could be charged and the full charging voltage could be transmitted to the actuators. Accordingly, it was possible at the onset to inject only partial fuel quantities.

If the charging switch X1 and the power MOSFET switch Mp are now actuated simultaneously, immediately after the voltage supply to the control circuit ST is turned on, and then the discharging switch X2 in this order is actuated once or more than once (depending on the dimensioning of the capacitors C1 and C2), then this procedure has the effect that the recharging capacitor C2 is already fully charged before the first fuel injection event is initiated.

We claim:

1. A device for driving a capacitive actuator, comprising:
    a control circuit;
    a voltage source connected to said control circuit, said voltage source having a positive pole and a negative pole;
    a charging capacitor connected between the positive pole and the negative pole of said voltage source;
    a first series circuit connected in parallel with said charging capacitor, said first series circuit including a charging switch connected to the positive pole and admitting current away from the positive pole, and a discharging switch connected to the negative pole and admitting current toward the negative pole;
    a second series circuit connected between a node of said charging switch and said discharging switch and said negative pole, said second series circuit including a recharging capacitor and a ring-around coil and a third series circuit formed of a first actuator and a first, controlled power MOSFET switch;
    at least one fourth series circuit connected in parallel to said third series circuit, said at least one fourth series circuit including a further actuator and a further power MOSFET switch;
    a diode connected in parallel to said third series circuit and to said at least one fourth series circuit, said diode conducting from the negative pole to said ring-around coil;
    a protective power MOSFET switch connected in parallel to said third series circuit; and
    a supplemental circuit connected to said protective power MOSFET switch for setting said protective power MOSFET switch into a conducting state.

2. The device according to claim 1, wherein said actuators are piezoelectrically operated fuel injection valves of an internal combustion engine.

3. The device according to claim 1, which further comprises voltage divider connected between a positive potential and the negative pole and having a tap, and wherein said protective power MOSFET switch has a gate terminal, said supplemental circuit includes a transistor wired as a constant current sink, said transistor having a collector terminal connected to said gate terminal of said protective power MOSFET switch, a base terminal connected to said tap of said voltage divider, and an emitter terminal connected via a resistor to the negative pole.

4. The device according to claim 3, wherein said protective power MOSFET switch has a terminal connected to the ring-around coil, and including a resistor connected between said gate terminal of said protective power MOSFET switch and the terminal of the power MOSFET switch connected to the ring-around coil.

5. The device according to claim 3, wherein said supplemental circuit includes a current mirror circuit receiving an input current determined by a voltage divider connected in parallel to a switching path of said protective power MOSFET switch, and outputting an output current determined by a mirror factor of said current mirror circuit, and wherein the output current of said current mirror circuit is supplied to said constant current sink through said collector terminal of said transistor.

6. The device according to claim 3, wherein said transistor is a first transistor, and including a second transistor having a base terminal connected to said control circuit and being driven by control signals from said control circuit, and having a collector-to-emitter path which, in a conducting state of said second transistor connects said base terminal of said first transistor to the negative pole and thus renders said protective power MOSFET switch conducting.

7. A method of controlling a capacitive actuator, which comprises:
    providing a control circuit, a voltage source connected to the control circuit, a charging capacitor connected between a positive pole and a negative pole of the voltage source, a first series circuit connected in parallel with the charging capacitor, the first series circuit including a charging switch connected to the positive pole, and a discharging switch connected to the negative pole of the voltage source, a second series circuit connected between a node of the charging switch and the discharging switch on the one hand and to the negative pole on the other hand, the second series circuit including a recharging capacitor and a ring-around coil and a third series circuit with a first actuator and a first, controlled power MOSFET switch, at least one fourth series circuit connected in parallel to the third series circuit, the at least one fourth series circuit including a further actuator and a further power MOSFET switch, a diode connected in parallel to the third series circuit and to the at least one fourth series circuit, the diode conducting from the negative pole towards the ring-around coil, a protective power MOSFET switch connected in parallel to the third series circuit, and a supplemental circuit connected to the protective power MOSFET switch; and
    controlling the protective power MOSFET switch with the supplemental circuit and setting the protective power MOSFET switch into the conducting state when an actuator voltage exceeds a predetermined limit value.

8. A method of controlling a capacitive actuator, which comprises:
    providing a control circuit, a voltage source connected to the control circuit, a charging capacitor connected between a positive pole and a negative pole of the voltage source, a first series circuit connected in parallel with the charging capacitor, the first series circuit including a charging switch connected to the positive pole, and a discharging switch connected to the negative pole of the voltage source, a second series circuit connected between a node of the charging switch and the discharging switch on the one hand and to the negative pole on the other hand, the second series circuit including a recharging capacitor and a ring-around coil and a third series circuit with a first actuator and a first, controlled power MOSFET switch, at least one fourth series circuit connected in parallel to the third series circuit, the at least one fourth series circuit including a further actuator and a further power MOSFET switch, a diode connected in parallel to the third series circuit and to the at least one fourth series circuit, the diode conducting from the negative pole towards the ring-around coil, a protective power MOSFET switch connected in parallel to the third series circuit, and a supplemental circuit connected to the protective power MOSFET switch; and transmitting a control signal from the control circuit to the supplemental circuit for setting the protective power MOSFET switch into the conducting state.

9. A method of actuating a device for driving at least one capacitive actuator with a control circuit, the method which comprises:

providing a charging capacitor connected between a positive pole and a negative pole of a voltage source regulated by the control circuit;

providing a first series circuit connected in parallel with the charging capacitor, the first series circuit including a charging switch connected to the positive pole and admitting current away from the positive pole, and a discharging switch connected to the negative pole and admitting current toward the negative pole;

providing a second series circuit connected between a node of the charging switch and the discharging switch on the one hand and the negative pole on the other hand, the second series circuit including a recharging capacitor connected to the charging switch, a ring-around coil and a third series circuit formed of a first actuator and a first, controlled power MOSFET switch;

providing at least one fourth series circuit connected in parallel to the third series circuit, the at least one fourth series circuit including a further actuator and a further controlled power MOSFET switch;

providing a diode connected in parallel to the third series circuit and to the at least one fourth series circuit, the diode conducting from the ground negative pole towards the ring-around coil; and providing a protective power MOSFET switch connected in parallel to the third series circuit and being controlled by control signals of the control circuit; and immediately upon an activation of the voltage source, and prior to a first actuator actuation, simultaneously actuating the charging switch and one of the controlled power MOSFET switches and subsequently actuating the discharging switch at least once.

* * * * *